United States Patent [19]

Böhm

[11] Patent Number: 4,657,344

[45] Date of Patent: Apr. 14, 1987

[54] METHOD OF FABRICATING A LIGHT-DIFFRACTING STRUCTURAL COMPONENT

[75] Inventor: Heinz Böhm, Erlangen, Fed. Rep. of Germany

[73] Assignee: U.S. Philips Corporation, New York, N.Y.

[21] Appl. No.: 871,142

[22] Filed: Jun. 2, 1986

Related U.S. Application Data

[63] Continuation of Ser. No. 635,983, Jul. 30, 1984, abandoned.

[30] Foreign Application Priority Data

Aug. 16, 1983 [DE] Fed. Rep. of Germany ....... 3329510

[51] Int. Cl.[4] ............................ G02B 5/18; B32B 3/00; B32B 15/00
[52] U.S. Cl. ............................ 350/162.24; 350/162.2; 350/320; 427/164; 427/166
[58] Field of Search ...................... 350/162.16, 162.17, 350/162.2, 162.24, 433, 320, 451; 427/164, 165, 166

[56] References Cited

U.S. PATENT DOCUMENTS

| | | | |
|---|---|---|---|
| 4,210,391 | 9/1980 | Cohen | 350/162.16 |
| 4,296,143 | 10/1981 | Franken et al. | 427/38 |
| 4,340,283 | 7/1982 | Cohen | 350/162.16 |

FOREIGN PATENT DOCUMENTS 2017331 10/1979 United Kingdom ........... 350/162.17

OTHER PUBLICATIONS

Suhara, T., et al. "Graded-Index Fresnel Lenses for Integrated Optics", *Applied Optics*, vol. 21, No. 11, pp. 1967-1971 (Jun. 1, 1982).

Primary Examiner—John K. Corbin
Assistant Examiner—David J. Edmondson
Attorney, Agent, or Firm—Marc D. Schechter

[57] ABSTRACT

Glass layers are deposited according to a prescribed refractive index profile. The multilayer component is divided into precalculated parts, which are rectangular in shape and which have the optical properties of cylinder lenses. The optical properties of such structural components can be determined within wide limits by the nature of the deposition.

6 Claims, 4 Drawing Figures

METHOD OF FABRICATING A LIGHT-DIFFRACTING STRUCTURAL COMPONENT

This is a continuation of application Ser. No. 635,983, filed July 30, 1984 now abandoned.

BACKGROUND OF THE INVENTION

The invention relates to a method of fabricating an optical component. The optical component consists of a large number of thin glassy layers of different refractive indices deposited from the vapor phase in a prescribed sequence on a solid substrate. Gratings made in this way are used, for example, in optical telecommunications.

European Patent Application No. 0,017,296 (corresponding to U.S. Pat. No. 4,296,143) describes the fabrication of rotationally symmetric lenses by depositing, from vapor phase, a large number of thin glassy layers of different refractive indices into grooves in a glass plate. The thickness of the coated glass plate is reduced, after the glass deposition, to its original value. There remain in the grooves the halves of so-called Luneberg lenses, which consist of superimposed semispherical layers.

In the known method, good results depend on the accuracy with which the grooves are produced in the glass plate and on the precision in the mechanical treatment of the glass layers left after reduction.

SUMMARY OF THE INVENTION

It is an object of the invention to provide a method of fabricating versatile diffraction gratings and other optical components by depositing glass layers from the vapor phase in only a few process steps.

According to the invention, a large number of layers with a prescribed refractive index profile are deposited one after the other. By cutting the multilayer structure in prescribed ways, different optical components can be produced. The particular advantage of this method is the many optical structural components which can be fabricated by providing different sequences of layers.

In a preferred embodiment of the invention, sequences of layers are deposited in such a way as to produce a parabolic refractive index profile. Parts are cut from the stack of layers whereby the cut faces are separated by integral multiples of one quarter pitch. A further advantage is that the substrate on which the layers are deposited does not have to be of any optical significance.

DESCRIPTION OF THE PREFERRED EMBODIMENTS

Figure 1:
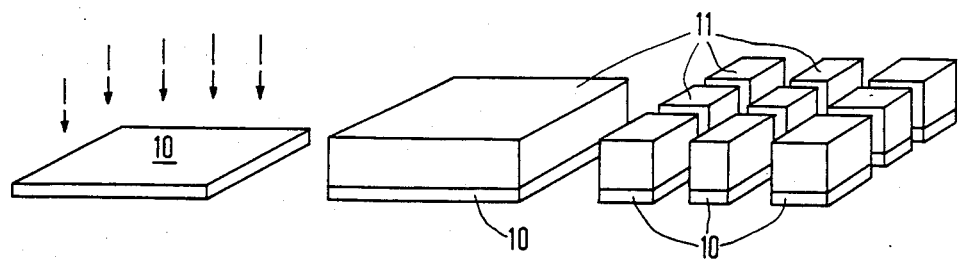
FIG. 1 is perspective views of various stages of manufacture of structural components fabricated by the method according to the invention.

The substrate 10 shown in FIG. 1 is coated by vapor deposition with a large number of thin layers of glass of different refractive indices. The dashed arrows represent glass being deposited. In order to obtain parallel, planar layers, the substrate surface must be smooth.

The deposition process is a CVD process described in European Patent Application No. 0,017,296. As compared to the fabrication of Luneberg lenses described therein, according to the invention the stack of layers is cut across the layers, based on optical calculations, into portions 11 that form independent optical components.

Figure 2:
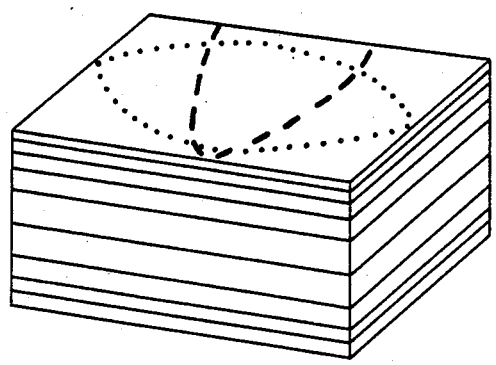
FIG. 2 is a perspective view of details of an optical grating according to the invention.

In the case of the optical component shown enlarged in FIG. 2, the optical properties depend on distance between the cut faces (that is, the faces cut across the layers) and the sequence of the deposition. In a practical example, the layers are considerably thinner and there is a much larger number of them than shown in the drawing.

The component shown in FIG. 2 can be used as two different gradient cylindrical lenses. The distance between the faces is calculated based on the desired pitch. Dotted lines indicate that when light passes through the component from left to right, or vice versa, the component behaves as a gradient cylindrical lens with a pitch of 0.5. When light passes through the component from front to rear, the component behaves as a gradient cylindrical lens with 0.25 pitch. A component of this type is particularly advantageous as optical systems that are operated in both senders and receivers of light signals.

In the component shown in FIG. 2, the substrate has been removed. A glass substrate is used in another embodiment, not shown in the drawing, in which the rays pass through the component vertically and the layers act as plane-parallel plates.

Figure 3:
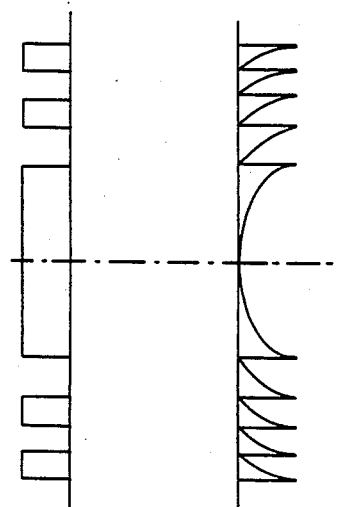
FIG. 3 schematically shows various usable sequences of layers.

The parts of the component can be based on any given selectable refractive index profile and can be fabricated accordingly. Diagrams of some refractive index profiles are shown in FIG. 3. In one case, layers of two different refractive indices are deposited alternately with differences of thickness. Alternating layers of different refractive index can be given a fine structure.

The possible sequences of layers indicated in FIG. 3 illustrate the many different optical components that can be made by the method. For example, Fresnel cylinder lenses can be made by the method. (Applied Optics, Vol. 21, No. 11, June '82, pages 1967).

Components made by the method described need not have only rectangular external shapes. They can also have curved surfaces which can be cut out of a stack of layers, and they can also be given a shape where the surfaces have to be finished by subsequent polishing.

Figure 4:
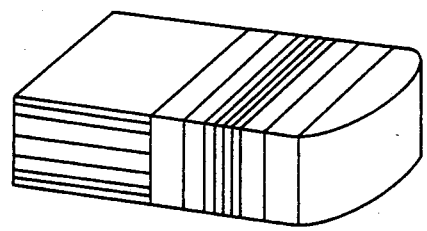
FIG. 4 is a perspective view of a group of optical gratings made by the method.

FIG. 4 shows an assembly of components made by the method described. By reason of their smooth surfaces, the components made according to the invention can very easily be combined, for example, by cementing them together. In combination, these components produce an optical system equivalent in quality to traditional groups of lenses and prisms. However, by virtue of their shapes which depend on the method of fabrication, these components can be assembled at exceptionally low costs.

The invention can, in addition, be used with the known method of manufacturing Luneberg lenses by the CVD process. Before grinding off the remaining layers, pieces can be removed from the plate in the manner described above, especially from the edge. This results in even better utilization of the deposited material.

What is claimed is:

1. A method of manufacturing an optical component, said method comprising the steps of:
   providing a substantially planar substrate;
   successively depositing, from a vapor, a large number of substantially planar thin glass layers on the substrate to form a preform, said layers having different refractive indices and being arranged to form a parabolic refractive index profile along a line perpendicular to the layers; and
   cutting the preform across the layers to form optical components with cut faces extending across the layers.

2. A method as claimed in claim 1, characterized in that:
   the optical component has an axis extending from a first cut face of the component to a second opposite cut face of the component;
   the optical component has a pitch which is equal to the distance over which an undulating light beam, passing from the first cut face of the component to the second opposite cut face of the component, crosses the component axis twice; and
   the distance between the first and second cut faces of the component is equal to a multiple of the pitch.

3. A method as claimed in claim 1, characterized in that:
   the optical component has an axis extending from a first cut face of the component to a second opposite cut face of the component;
   the optical component has a pitch which is equal to the distance over which an undulating light beam, passing from the first cut face of the component to the second opposite cut face of the component, crosses the component axis twice; and
   the distance between the first and second cut faces of the component is equal to a multiple of one-quarter of the pitch.

4. A method of manufacturing an optical component, said method comprising the steps of:
   providing a substantially planar substrate;
   successively depositing, from a vapor, a large number of substantially planar thin glass layers on the substrate to form a preform, said layers having different refractive indices and being arranged to form a selected refractive index profile along a line perpendicular to the layers; and
   cutting the preform across the layers to form optical components with cut faces extending across the layers, said cut faces being curved.

5. A method as claimed in claim 2, characterized in that the cut faces are spherical.

6. A method of manufacturing an optical component assembly, said method comprising the steps of:
   providing a substantially planar substrate;
   successively depositing, from a vapor, a large number of substantially planar thin glass layers on the substrate to form a preform, said layers having different refractive indices and being arranged to form a selected refractive index profile along a line perpendicular to the layers;
   cutting the preform across the layers to form optical components with cut faces extending across the layers; and
   joining together two or more optical components along cut faces having mating shapes.

* * * * *